United States Patent [19]

Sargis

[11] 4,135,788
[45] Jan. 23, 1979

[54] CYCLE HANDLEBAR REAR VIEW MIRROR ASSEMBLY

[76] Inventor: Albert Sargis, 70 Grove Hill, Apt. 4W, New Britain, Conn. 06052

[21] Appl. No.: 838,678

[22] Filed: Oct. 3, 1977

[51] Int. Cl.² .............................................. G02B 5/10
[52] U.S. Cl. ................................. 350/307; 248/475 B
[58] Field of Search ............... 350/307, 293, 288, 310, 350/67, 107; D12/189; 74/551.8; 248/475 B, 475 R, 481

[56] References Cited

U.S. PATENT DOCUMENTS

D. 247,292   2/1978   Brown .............................. D12/189

FOREIGN PATENT DOCUMENTS 228441   5/1960   Australia ................................. 350/307
1240031  7/1960   France ..................................... 248/481
695599   8/1953   United Kingdom ..................... 350/293

*Primary Examiner*—Jon W. Henry

[57] ABSTRACT

A mirror assembly for mounting in the end of a cycle handlebar includes an insert member having a mounting post with a generally spherical head portion and a mirror mounting member having a mounting portion including a pair of spaced parallel walls with opposed recesses therein seating the head of the insert member for substantially universal movement thereon. The mirror mounting member also has a body portion with a cavity of circular cross section having a reduced diameter lip portion adjacent the outer end thereof. Seated within the cavity of the mirror mounting member is a mirror with an outer face of generally convex configuration and having its peripheral portion disposed under the lip of the recess. A resiliently compressible backing member adhered to the inner surface of the mirror bears upon the bottom wall defining the cavity to bias the outer face of the mirror against the peripheral lip of the cavity. Clamping means on the mounting portion of the mirror mounting member clamps the walls thereof about the spherical head portion to establish the clamping pressure and thereby the amount of frictional resistance to universal pivotal movement.

9 Claims, 6 Drawing Figures

CYCLE HANDLEBAR REAR VIEW MIRROR ASSEMBLY

BACKGROUND OF THE INVENTION

Providing rear view mirrors upon bicycles, motorcycles and the like has proven extremely desirable to increase the safety of operation and accordingly to minimize accidents. Some rear view mirrors are mounted upon a bracket which is clamped along the length of the handlebar and others have been mounted upon the crossbars and diagonal bars of the cycle chassis, as for example that illustrated in Cululi et al. U.S. Letters Pat. No. 3,981,567 granted Sept. 21, 1976. Locating the mirror along the length of the cycle handlebar represents a problem from the standpoint of obstruction of the field of view by the body of the rider so that there have been proposed structures relying upon mounting of the mirror in the end of the handlebar. One type of such a mirror assembly is shown in Aurness U.S. Letters Pat. No. 702,763 granted June 17, 1902. More recently, it has been proposed to pivotably mount the mirror upon an insert member which is disposed within the end of the handlebar.

It is desirable to be able to effect substantially universal pivotal movement of the mirror assembly relative to the cycle handlebar in order to provide the proper field of view for a particular rider. However, frequently universal joints produce undesired or inadvertent movement of the mirror from the desired position as a result of impacts, vibration and the like to which the cycle is exposed. A further problem that occurs with respect to rear view mirror on cycles is the tendency for the mirror to shatter or crack when the mirror is fabricated from glass when the mirror is subjected to impacts. Moreover, it is desirable to use a convex mirror to increase the field of vision accorded thereby.

Various techniques for improving the impact resistance of mirrors have been proposed, as for example those shown in Perison U.S. Letters Pat. No. 3,776,618 granted Dec. 4, 1973 and Kurz U.S. Letters Pat. No. 3,843,236 granted Oct. 22, 1974, but there has remained a problem with respect to providing an adequate impact absorbing mounting for a convex mirror of the type that would be desirably employed in connection with cycles.

Accordingly, it is an object of the present invention to provide an improved novel rear view mirror assembly for mounting in the ends of a cycle handlebar and which provides both controllable universal pivotal movement of the mirror assembly and a highly desirable level of impact absorbing properties.

It is also an object to provide such a mirror assembly wherein the impact absorbing portion of the assembly also prevents the shattering of the mirror.

Another object is to provide such a mirror assembly which may be readily fabricated from economically produced component parts to provide a long lasting and rugged assembly.

Still another object is to provide a novel method for assembling and adjusting a rear view mirror in the ends of the handlebar of a cycle or the like.

SUMMARY OF THE INVENTION

It has now been found that the foregoing and related objects may be readily attained in a mirror assembly for mounting in the end of a tubular handlebar of a cycle or the like comprising an insert member of synthetic resin having a collar portion dimensioned to abut the outer end of the handlebar, a shank portion extending in one direction from and of lesser diameter than the collar portion and adapted to frictionally engage within the handlebar. The insert member also has a mounting post extending in the opposite direction from the collar portion and the post has a generally spherical head portion.

A mirror mounting member on the insert member has a generally cylindrical body portion with a cavity of circular cross-section opening on one surface thereof, and the wall of the body portion defining the cavity has a reduced diameter portion adjacent the outer end thereof to define a peripheral lip. The mounting member also has a mounting portion including a pair of transversely spaced, parallel walls extending perpendicularly to the opposite surface of the body portion and receiving therebetween the spherical head portion of the insert member. These parallel walls have aligned recesses in the opposed surfaces thereof spaced outwardly from the body portion which seat the spherical head portion of the insert member for substantially universal pivotal movement therebetween.

Clamping means is provided on the walls of the mirror mounting member for releasably clamping the walls together about the spherical head portion to establish the clamping pressure and thereby the frictional resistance to universal pivotal movement. Seated in the recess of the mirror mounting member and arching outwardly thereof is a mirror of plate-like, generally convex configuration. This mirror has its periphery extending under the lip of the recess, and a resiliently compressible backing member is adhered to the inner surface of the mirror and bears upon the bottom wall of the body portion of the mirror mounting member defining the cavity. As a result, this backing member biases the outer face of the mirror against the peripheral lip.

In the preferred embodiment, the mirror mounting member is fabricated from synthetic resin, and the wall of the body portion defining the cavity is of lesser cross section at the reduced diameter portion so as to provide deflectability at the peripheral lip. The recesses in the parallel walls of the mounting portion of the mirror mounting member are apertures which extend through the walls and are of lesser diameter than the spherical head portion of the insert member.

Desirably, the shank portion of the insert member has ribs on the periphery thereof which are deflectable to permit insertion of the shank portion into the end of the tubular handlebar, and the insert member includes a neck portion on the mounting post tapering to a reduced diameter between the collar portion and the spherical head portion. Conveniently, the clamping means comprise a threaded member extending between the walls of the mirror mounting member and nut means threadably engaged therewith to permit adjustment of the clamping pressure.

Preferably, the resiliently compressible backing member is fabricated of an elastomer and is of convex configuration cooperating with the convex configuration of said mirror so that only its peripheral portion is in contact with the bottom wall of the mirror mounting member defining the cavity. Additionally, the resiliently compressible backing member is of lesser diameter than the mirror. In the method for making a mirror, an insert member is formed of synthetic resin with a collar portion dimensioned to abut the outer end of the handlebar, a shank portion extending in one direction from and of lesser diameter than the collar portion, and a mounting post extending in the opposite direction from the collar portion and with a generally spherical head portion. A mirror mounting member is formed with a generally cylindrical body portion with a cavity of circular cross section opening on one surface thereof, the wall of said body portion defining the cavity having a reduced diameter portion adjacent the outer end thereof to define a peripheral lip. The mounting member is also formed with a mounting portion including a pair of transversely spaced, parallel walls extending perpendicularly to the opposite surface of the body portion and receiving therebetween the spherical head portion of the insert member, and these walls have aligned recesses in the opposed surfaces thereof spaced outwardly from the body portion to seat therein the spherical head portion for substantially universal pivotal movement.

The head portion of the insert member is inserted between the parallel walls of the mirror mounting member and seated in the recesses thereof.

A mirror is formed with plate-like, generally convex configuration and with a diameter lesser than that of the cavity in the mirror mounting member and greater than that of the portion of the cavity defined by the peripheral lip. A resiliently compressible backing member is adhered to the concave surface of the mirror, and this is pressed into the subassembly of the mirror and backing member cavity. The peripheral lip then overlies the peripheral portion of the mirror, and the backing member bears upon the bottom wall of the body portion of said mirror mounting member defining the cavity, so that the member biases the outer face of the mirror against the peripheral lip.

Clamping means on the walls of the mirror mounting member is adjusted to releasably clamp the walls together about the spherical head portion to establish the clamping pressure and thereby the frictional resistance to universal pivotal movement of the mirror mounting member upon the head portion of said insert member.

DETAILED DESCRIPTION OF THE ILLUSTRATED EMBODIMENT

Figure 1:
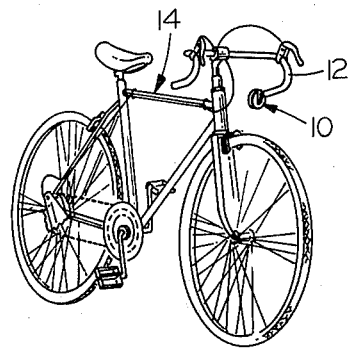
FIG. 1 is a perspective view of a bicycle having the rear view mirror assembly of the present information mounted thereon.

Turning now in detail to FIG. 1 of the attached drawings, a mirror mounting assembly embodying the present invention generally designated by the numeral 10 is shown as mounted in the end of the handlebar 12 of the bicycle generally designated by the numeral 14.

As seen in FIGS. 2-6, the mirror assembly includes an integrally formed insert member generally designated by the numeral 16, a mirror mounting member generally designated by the numeral 18, a convex mirror generally designated by the numeral 20 and a resiliently compressible backing member generally designated by the numeral 22. In addition, adjustable clamping means generally designated by the numeral 24 is provided upon the mirror mounting member 18 to permit adjustment of the clamping pressure at the pivot as will be discussed more fully hereinafter.

Figure 2:
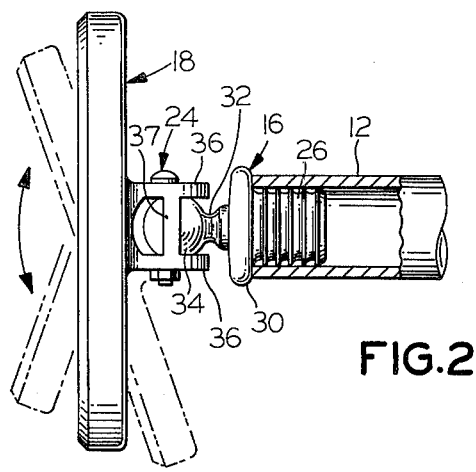
FIG. 2 is a fragmentary plan view to a greatly enlarged scale of the handlebar end and the rear view mirror assembly with a portion of the handlebar end broken away to reveal internal construction and with the mirror mounting member shown in two pivoted positions in phantom line.
Figure 5:
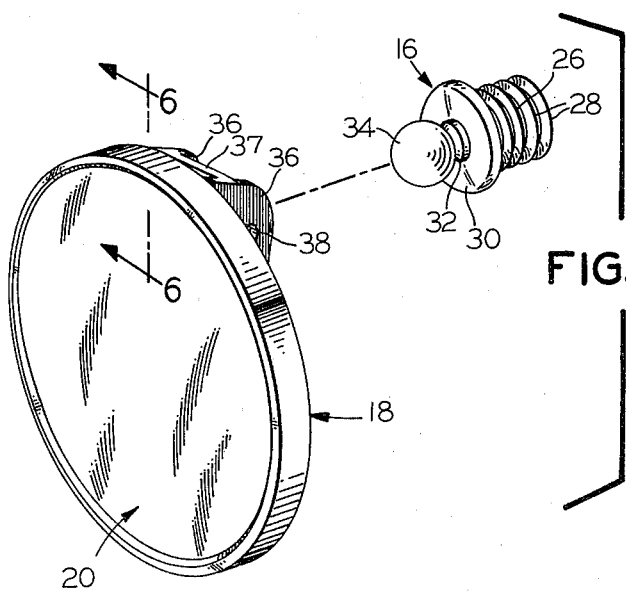
FIG. 5 is a partially exploded view of the mirror assembly.
Figure 3:
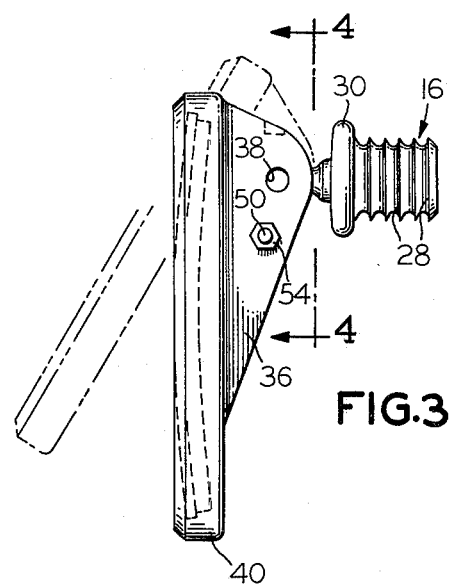
FIG. 3 is a side elevational view of the mirror assembly of FIGS. 1 and 2 showing the mirror mounting member in phantom line in a pivoted position thereof.

Turning now in detail to the insert member 16, it is fabricated from synthetic resin and includes a shank portion 26 having a series of circumferential ribs 28 thereabout which are resiliently deflectable to permit insertion of the shank portion 26 into the hollow cycle handlebar 12, as best seen in FIG. 2. The ribs 28 provide frictional engagement of the insert member 16 within the handlebar 12. Abutting the end of the handlebar 12 is the generally circular collar 30 and extending outwardly therefrom is the mounting post provided by the neck portion 32 and the generally spherical head portion 34 at its outer end.

The mirror mounting member 18 has a mounting portion provided by a pair of transversely spaced parallel walls 36 which extend along opposite sides of the spherical head portion 34 and which have apertures 38 of lesser diameter than the spherical head portion 34 so as to provide a pivotal seat therefor. The body portion 40 of the mirror mounting member 18 has a cavity 42 of circular cross section opening on the surface thereof opposite that from which the walls 36 extend. A reduced diameter portion adjacent the outer end of the cavity 42 provides a lip 44 extending about the inner periphery thereof. The wall section of the body portion 40 is also reduced adjacent the lip 44 so as to enhance the resilient deformability thereof for purposes to be described more fully hereinafter.

Figure 6:
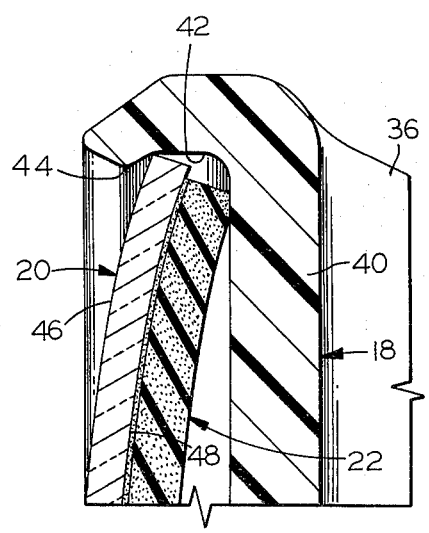
FIG. 6 is a fragmentary sectional view to an enlarged scale along the line 6 — 6 of FIG. 5.

The mirror 20 is a plate-like structure with parallel front and rear surfaces designated by the numerals 46 and 48 respectively and has a generally convex configuration as seen in FIG. 6. The diameter of the mirror 20 is substantially equal to the diameter of the main portion of the cavity 42 and is greater than the diameter of the reduced cavity portion defined by the peripheral lip 44 so that it is entrapped therebehind in the assembly.

Adhesively engaged upon the rear or inner surface 48 of the mirror 20 is the resiliently compressible backing member 22 which has parallel front and rear surfaces and conforms closely to the convex configuration of the mirror 20. The thickness of the backing member 22 is sufficient to produce compression of the peripheral portion thereof when the subassembly of mirror 20 and backing member 22 is inserted into the cavity 42. As a result, the backing member 22 biases the mirror 20 outwardly and tightly against the lip 44 to minimize movement of the mirror subassembly within the cavity 42. Most conveniently, the diameter of the backing member 22 is slightly less than that of the mirror 20 substantially as illustrated in FIG. 6.

Figure 4:
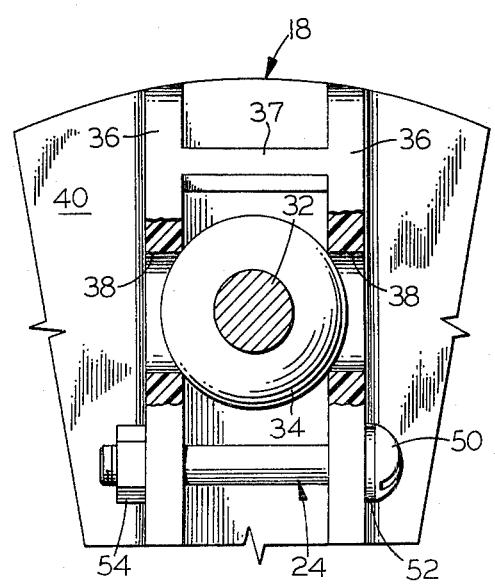
FIG. 4 is a sectional view to an enlarged scale along the line 4 — 4 of FIG. 3.

As seen in FIG. 4, the spherical head portion 34 of the insert member seats within the apertures 38 of the walls 36 of the mirror mounting member 18 so that the mirror mounting member 18 may be pivoted substantially universally thereabout. Since inadvertent pivotal movement is undesired, the clamping means 24 can be adjusted to vary the pressure exerted by the walls 36 upon the head portion 34 and thereby the frictional resistance to relative movement. Conveniently, the clamping means 24 comprises the integral rib 37 extending between the walls 36 on one side of the head portion 34 and, on the other side, an assembly of machine screw 50, washer 52 and nut 54. Thus, whenever it is desired to effect adjustment, the amount of frictional resistance can be reduced by decreasing the amount of thread of the machine screw 50 which is captured in the nut 54.

In making the assembly, the insert member 16 is desirably integrally formed from a synthetic resin providing a limited degree of deflection in the area of the rib 26 such as polyamides and acrylonitrile/butadiene/styrene interpolymers. Although the mirror mounting member 18 may be integrally formed from a metal providing some degree of resilient deflectability in the area of the lip 44, it too is conveniently formed from synthetic resins such as those employed for the insert member 16. The mirror 20 is conveniently obtained in the desired convex configuration and the resilient backing member 22 is conveniently obtained as sheet stock which is cut and then adhesively bonded to the inner surface of the mirror 20 either by a separate adhesive coating indicated by the stippling in FIG. 6 or by solvent or heat sealing.

The ribs 26 on the insert member 16 may be formed during the molding operation or they may be generated subsequently thereto by machining or similar processes. Similarly, the apertures 38 in the mirror mounting member 18 may be generated by a suitably configured die or they may be subsequently formed by drilling, punching or the like; the same is true with respect to the apertures to seat the clamping means or fastener 24.

Following generation of the several components, the mirror subassembly provided by the mirror 20 and the backing member 22 bonded thereto are pressed inwardly into the cavity 42 of the mirror mounting member 18. As they are pressed inwardly, the lip 44 is deflected outwardly to permit passage of the mirror subassembly thereby and, upon such passage, the lip 44 resumes its original position shown in FIG. 6, thereby trapping the mirror subassembly within the cavity. In this position, the backing member 22 is partially compressed about its periphery so as to provide a biasing pressure holding the mirror 20 tightly against the lip 44 of the mirror mounting member 18.

For purposes of shipment and sale, the mirror mounting subassembly thus produced is conveniently loosely mounted upon the insert member 16 by pressing the head portion 34 between the parallel walls 36 until the head portion 34 seats in the apertures 38 thereof. The clamping means 24 may be loosely assembled to prevent inadvertent disengagement during shipment or handling. However, for ease of assembling upon the bicycle handlebar, it may be desirable to disassemble the insert member 16 from the assembly. In this manner, the insert member may be separately forced into the end of the handlebar until the collar seats against the end of the handlebar tube. The mirror mounting member 18 containing the mirror subassembly may then be mounted upon the insert member 16.

After the assembly has been secured in the end of the handlebar, the user of the cycle pivots the mirror mounting member 18 while he is seated on the cycle until he obtains the desired field of rear view vision. The clamping means 24 is then tightened to prevent inadvertent pivotal movement of the mirror mounting subassembly. As will be appreciated, a subsequent user of the cycle may readily effect readjustment by loosening the clamping means 24 to effect readjustment and then tightening the clamping means 24. The same can be done if sufficient impact should be made upon the mirror subassembly to produce undesired movement.

As will be appreciated, the resiliently deformable backing member is adhesively engaged to the rear surface of the convex mirror and thus not only provides the means for maintaining the mirror firmly seated against the lip of the cavity, but also provides for absorbing impacts occurring upon the mirror. This impact absorption characteristic will normally prevent breakage of the mirror but, if breakage should occur, the backing member will prevent the mirror from shattering into loose pieces of glass since substantially its entire surface is adhesively bonded to the backing member. Thus, the mirror assembly of the present invention is less likely to produce cuts to the rider of the cycle or those who may be passengers on the cycle in the event of impact sufficient to cause breakage of the mirror.

It will be appreciated that the components of the mirror assembly may vary from those specifically illustrated. For example, the mirror mounting member may be comprised of a series of separate component elements which are integrated into the desired structure. Moreover, if so desired, the lip portion of the cavity may be formed as a separate element which is mounted upon the wall defining the cavity after insertion of the mirror thereinto; obviously, the illustrated embodiment affords significant advantages in the integration of separate elements. In place of the transverse rib between the walls of the mirror mounting member, a second fastener assembly or rivet may be used to complete the clamping means. Similarly, the insert member may be assembled from individual elements and different materials may be utilized for the separate elements. If so desired, the backing member may have a flat inner surface bearing upon the bottom wall of the cavity over substantially its entire surface; however, the structure of the illustrated embodiment provides the desired biasing pressure and resistance to shattering of the mirror while at the same time absorbing impacts through the resilient compression about its peripheral portion. Therefor, the excess of material in the central portion can be eliminated without any significant diminution in the desired properties.

From the foregoing detailed specification and drawings, it will be appreciated that the present invention provides a novel rear view mirror assembly for mounting in the ends of a cycle handlebar and provides both controllable universal pivotal movement for the mirror as well as a high desired level of impact absorbing properties. The backing member functions to prevent the shattering of the mirror into small pieces which might injure the driver or passenger on the cycle, and the assembly lends itself to being readily fabricated from economically produced components to provide a long lasting, rugged assembly.

Having thus described the invention I claim:

1. A mirror assembly for mounting in the end of a tubular handlebar of a cycle or the like comprising:
    A. an insert member of synthetic resin having:
        (1) a collar portion dimensioned to abut the outer end of the handlebar,
        (2) a shank portion extending in one direction from and of lesser diameter than said collar portion, said shank portion being adapted to frictionally engage within the handlebar, and (3) a mounting post extending in the opposite direction from said collar portion and having a generally spherical head portion;

B. a mirror mounting member having:
  (1) a generally cylindrical body portion with a cavity of circular cross-section opening on one surface thereof, the wall of said body portion defining said cavity having a reduced diameter portion adjacent the outer end thereof to define a peripheral lip, and
  (2) a mounting portion including a pair of transversely spaced, paralled walls extending perpendicularly to the opposite surface of said body portion and receiving therebetween said spherical head portion of said insert member, said walls having aligned recesses in the opposed surfaces thereof spaced outwardly from said body portion and having said spherical head portion seated therein for substantially universal pivotal movement therewithin;

C. clamping means on said walls of said mirror mounting member for releasably clamping said walls together about said spherical head portion to establish the clamping pressure and thereby the frictional resistance to said universal pivotal movement;

D. a circular mirror of plate-like, concavo-convex configuration seated in said recess of said mirror mounting member and arching outwardly thereof, said mirror having its periphery extending under said lip of said recess; and E. a resiliently compressible synthetic resin backing member of concavo-convex configuration, said backing member extending in surface contact over at least the major portion of the inner surface of said mirror and being adhered to the inner surface of said mirror over substantially their entire opposing surfaces, said backing member bearing upon the bottom wall of said body portion of said mirror mounting member defining said cavity and biasing the outer face of said mirror against said peripheral lip.

2. The mirror assembly in accordance with claim 1 wherein said mirror mounting member is fabricated from synthetic resin and said body portion is integrally formed.

3. The mirror assembly in accordance with claim 1 wherein the wall of said body portion defining said cavity is of lesser cross section at said reduced diameter portion so as to provide deflectability at said peripheral lip.

4. The mirror assembly in accordance with claim 1 wherein said recesses in said parallel walls of said mounting portion of said mirror mounting member comprise apertures extending through said walls and of lesser diameter than said spherical head portion of said insert member.

5. The mirror assembly in accordance with claim 1 wherein said shank portion of said insert member has ribs on the periphery thereof which are deflectable to permit insertion of said shank portion into the end of the tubular handlebar.

6. The mirror assembly in accordance with claim 1 wherein said insert member includes a neck portion on said mounting post extending between said collar portion and said spherical head portion, said neck portion tapering to a reduced diameter adjacent said head portion.

7. The mirror assembly in accordance with claim 1 wherein said clamping means includes a threaded member extending between said walls of said mirror mounting member and nut means threadably engaged therewith to permit adjustment of the clamping pressure.

8. The mirror assembly in accordance with claim 1 wherein said resiliently compressible backing member is fabricated of an elastomer and has a concavo-convex configuration cooperating with the concavo-convex configuration of said mirror so that only its peripheral portion is in contact with said bottom wall of said mirror mounting member defining said cavity.

9. The mirror assembly in accordance with claim 1 wherein said resiliently compressible backing member is of lesser diameter than said mirror.

* * * * *